US009345993B2

(12) United States Patent
Niizato et al.

(10) Patent No.: US 9,345,993 B2
(45) Date of Patent: May 24, 2016

(54) CLEANING APPARATUS FOR FILTRATION LAYER IN SEAWATER INFILTRATION INTAKE

(75) Inventors: Hideyuki Niizato, Osaka (JP); Takayuki Inoue, Osaka (JP); Kiyokazu Mukai, Osaka (JP); Hitoshi Mimura, Osaka (JP)

(73) Assignees: HITACHI ZOSEN CORPORATION, Osaka (JP); NAGAOKA CORPORATION, Osaka (JP)

( * ) Notice: Subject to any disclaimer, the term of this patent is extended or adjusted under 35 U.S.C. 154(b) by 119 days.

(21) Appl. No.: 14/347,525

(22) PCT Filed: Aug. 10, 2012

(86) PCT No.: PCT/JP2012/070532
§ 371 (c)(1),
(2), (4) Date: Mar. 26, 2014

(87) PCT Pub. No.: WO2013/058009
PCT Pub. Date: Apr. 25, 2013

(65) Prior Publication Data
US 2014/0238924 A1   Aug. 28, 2014

(30) Foreign Application Priority Data
Oct. 20, 2011   (JP) .................................. 2011-230916

(51) Int. Cl.
*B01D 24/46*   (2006.01)
(Continued)

(52) U.S. Cl.
CPC ............ *B01D 24/4626* (2013.01); *C02F 1/004* (2013.01); *E03B 3/04* (2013.01);
(Continued)

(58) Field of Classification Search
CPC ........ E03B 3/04; C02F 1/004; C02F 2103/08; C02F 2201/008; C02F 2303/16; B01D 24/4621; E02B 3/023; E02B 3/8866
USPC ................................................. 210/270, 273
See application file for complete search history.

(56) References Cited

U.S. PATENT DOCUMENTS 1,767,729 A * 6/1930 Bayard ................ B01D 24/205
180/9.64
3,412,862 A * 11/1968 Chaplin .................. E02B 3/023
15/1.7
(Continued)

FOREIGN PATENT DOCUMENTS

JP      53-055571 A    5/1978
JP   2003-080010 A    3/2003
(Continued)

OTHER PUBLICATIONS

International Preliminary Report on Patentability, and Transmittal and Translation thereof, in corresponding International Application No. PCT/JP2012/070532, dated May 1, 2014, 6 pages.
International Search Report for International Application No. PCT/JP2012/070532, dated Sep. 4, 2012, 1 page.

*Primary Examiner* — Matthew O Savage
(74) *Attorney, Agent, or Firm* — Brinks Gilson & Lione

(57) ABSTRACT

To provide a cleaning apparatus suitable for removing clogging substances trapped in a surface layer of a sand filtration layer. A cleaning apparatus equipped with drive wheels serving as a driving device configured to move across a surface of a sand filtration layer. A pump and a jet nozzle are provided as an agitation device configured to agitate a surface layer portion of the sand filtration layer only at a desired depth, and which blows the clogging substances upward into the seawater in a turbid water intake pit together with a filtration sand. A perforated pipe for suctioning turbid water, a pump, an ejector, and a discharge pipe for dilute turbid water are provided as a suction and discharge device configured to suction turbid water blown upward into seawater in the water intake pit by the agitation device, and discharge it to outside of the turbid water intake pit. Prevents clogging by performing a timely cleaning of the sand filtration layer, thereby making it possible to maintain a high-speed seawater infiltration rate for seawater. Impact on the surrounding environment is reduced, because the apparatus suctions turbid water containing clogging substances which is blown upward into the turbid water intake pit, and discharges it to outside of the system.

3 Claims, 5 Drawing Sheets

(51) Int. Cl.
*C02F 1/00* (2006.01)
*E03B 3/04* (2006.01)
*E02F 3/88* (2006.01)
*E02B 3/02* (2006.01)
*C02F 103/08* (2006.01)

(52) U.S. Cl.
CPC ........ *B01D 24/4621* (2013.01); *C02F 2103/08* (2013.01); *C02F 2201/008* (2013.01); *C02F 2303/16* (2013.01); *E02B 3/023* (2013.01); *E02F 3/8866* (2013.01); *Y02W 10/37* (2015.05)

(56) References Cited

U.S. PATENT DOCUMENTS 3,925,202 A * 12/1975 Hirs ................ B01D 17/08
210/274
6,228,256 B1 * 5/2001 Ekenback ............ B01D 24/205
15/1.7

FOREIGN PATENT DOCUMENTS

JP  2005-161229 A  6/2005
JP  3899788 B2  3/2007

* cited by examiner

11 Cleaning apparatus

CLEANING APPARATUS FOR FILTRATION LAYER IN SEAWATER INFILTRATION INTAKE

This application is a 371 application of PCT/JP2012/70532 having an international filing date of Aug. 10, 2012, which claims priority to JP2011-230916 filed Oct. 20, 2011, the entire contents of what are incorporated herein by reference.

TECHNICAL FIELD

The present invention relates to a cleaning apparatus for preventing clogging of a sand filtration layer by removing clog-causing substances when they accumulate on a surface layer of the sand filtration layer or are trapped therein, in order to continuously implement a seawater infiltration intake method for the intake of seawater which has been infiltrated in the sand filtration layer.

BACKGROUND ART

In seawater desalination plants, which are plants which typically perform seawater intake, reverse osmosis methods which employ reverse osmosis membranes have become commonly used in recent years, instead of evaporation-type water treatment methods. In such reverse osmosis methods, clean seawater with fewer contaminants is sought through pre-treatment to produce fresh water, in order to reduce poor performance resulting from fouling (clogging) of reverse osmosis membranes by contaminants.

As shown in FIG. 7, in an example of a present seawater intake method, a direct water intake method is used in which seawater is taken in from a water intake orifice 1 via a water conduit 2 provided on the ocean floor. In FIG. 7, Reference Numeral 3 is a pump for taking in the seawater, and Reference Numeral 4 is a reverse osmosis membrane system.

However, when employing the direct water intake method, debris, sediments, and living organisms are all taken in at the same time as the water, and thus there are cases in which water intake has to be stopped, for example, when there is abnormal adhesion of jellyfish or algal blooms, oil spill accidents, and increased turbidity due to high waves. Moreover, when employing the direct water intake method, it is necessary to perform periodic cleaning, to add chemicals such as chlorine to prevent adhesion, or to increase the diameter of pipes when living organisms becoming attached to the entire length of the pipes are taken into consideration, because the adhesion of sea life such as barnacles and mussels can be significant. Furthermore, when chlorine is introduced into seawater to prevent the adhesion of marine life when employing the direct water intake method, there arise problems of environmental pollution and biofouling of reverse osmosis membranes, which are remotely caused by chlorine. In addition, when intake seawater is treated by reverse osmosis, a sand filtration system must be installed for filtering seawater to which a coagulant has been added, and thus there is a need to install a system for treating sludge which accumulates in the sand filtration system.

Accordingly, in recent years, attention has been focused on indirect water intake methods which take in seawater from a sand layer 5 on the ocean floor, as shown in FIG. 8, without using chemicals such as coagulants to pre-treat the intake seawater.

As illustrated in FIG. 9, an indirect water intake method is a method which involves excavation of an ocean floor at an offshore site several hundred meters from a shoreline and at a depth of several tens of meters, forming a sand filtration layer 5 from supporting gravel layers 5a and 5b, and a filtration sand 5c, and implementing backfilling up to the same ocean floor surface to install an intake pipe 6 in the supporting gravel layer 5a, from which seawater which is purified by infiltration is taken in. Although none of the problems of the direct water intake method arise when this indirect water intake method is employed, there are problems such as initial high cost and reduced water intake volume due to clogging when clogging substances (e.g., silt) become trapped in the surface layer of the sand filtration layer, and consequently, this method has been slow in achieving widespread use.

In a specific example of an indirect water intake method, the seawater infiltration rate achieved in the sand filtration layer on the ocean floor is set at 1-8 m/day, and it is also characterized in that the water depth of the sand filtration layer is greater than the critical water depth for total sediment movement at which sand in the surface layer portion of the sand filtration layer travels at least 50 cm, and less than the critical water depth for surface layer movement at which the sand travels at least 1 cm (Patent Reference 1). However, in the water infiltration intake method disclosed in Patent Reference 1, a large surface area is needed for the intake of a large volume of seawater in a short period of time, because the seawater infiltration intake rate of 1-8 m/day is a very slow filtration rate, and therefore requires a large-scale construction and increased cost.

In addition, since the water infiltration intake method disclosed in Patent Reference 1 utilizes natural waves or currents to remove clogging substances (e.g., silt) which accumulate in the surface layer of the sand filtration layer, an installation site for the water infiltration intake facility is limited to an ocean area where seawater is vigorously moved by currents or waves.

Accordingly, in order the solve the first problem described above, the present applicant proposed a seawater infiltration method which increases the seawater infiltration rate as high as possible under 400 m/day to thereby make it possible to intake a large amount of water within a short time, greatly reduce the filtration surface area in comparison to the prior art, and significantly reduce the scale of construction.

With regard to the second problem, if the sand filtration layer is installed in an ocean area where there is little movement of seawater by waves or currents, it is necessary to clean by artificially removing clogging substances (such as silt) which are trapped in the surface layer of the sand filtration layer. In the past, in an apparatus for artificial cleaning in the case of a river, as shown in FIG. 10, a cleaning pipe 9 having holes 9a capable of blowing air into a gravel layer 7c was embedded in order to prevent clogging of an infiltration gallery formed by backfilling the gravel layer 7c, as well as a water collection pipe 8, and a sand layer 7b under a river bed of a river 7a.

However, if a pneumatic type cleaning pipe was used in a sand filtration layer in an ocean area where there is little movement of seawater by waves or currents, as shown in FIG. 10, clogging substances (such as silt) which are blown up into the sea above the sand filtration layer and highly concentrated turbid water containing filtration sand can drift into the area surrounding the sand filtration layer, and can become an environmental problem.

Patent Reference 1: Japanese Patent No. 3899788

SUMMARY OF THE INVENTION

Problems to be Solved by the Invention

One problem which the present invention aims to solve is that an installation site for a sand filtration layer was limited to a place where seawater was vigorously moved by currents or waves, because there was no cleaning apparatus for preventing clogging of a sand filtration layer which carried out osmotic intake of seawater. Another problem which the present invention aims to solve is that a prior art cleaning apparatus used in an infiltration gallery in a river was of the type in which air is blown from a cleaning pipe, so that when such a cleaning apparatus was used in an ocean area where there was little movement of seawater by waves or currents, clogging substances (such as silt) which are blown up into the sea above the sand filtration layer and highly concentrated turbid water containing filtration sand can drift into the area surrounding the sand filtration layer, and can become an environmental problem.

In particular, when the seawater infiltration rate of seawater was increased to a rate as high as possible under 400 m/day, as in the case of the water infiltration intake method disclosed by the present applicant, clogging readily progressed in the sand filtration layer, and the frequency of clogging also increased. Therefore, in order to maintain this high-speed infiltration, it is necessary to remove clogging substances (such as silt) which cause clogging of the sand filtration layer in a suitable and timely manner.

Means for Solving these Problems

The present invention solves the above problems, and was designed with the aim of providing a cleaning apparatus for a sand filtration layer which may be installed in an ocean area where there is little movement of seawater by waves or currents, and can reduce the risk of contaminating the environment in the area surrounding the sand filtration layer. In addition, the present invention aims to provide a cleaning apparatus capable of maintaining high-speed infiltration in a seawater infiltration intake method, by performing, in response to the state of the clogging, suitable cleaning of an infiltration surface of the sand filtration layer in a timely manner.

The cleaning apparatus of the present invention prevents clogging by removing clogging substances which accumulate or are trapped in a surface layer of sand filtration layer which performs osmotic intake of seawater. The cleaning apparatus comprises a driving device configured to move across a surface of the sand filtration layer, an agitation device configured to agitate a surface layer portion only at a desired depth and blows the clogging substances upward into the seawater in a turbid water intake pit together with a filtration sand of the surface layer portion, and a suction and discharge device configured to suction the turbid water blown by the agitation device into seawater in a turbid water intake pit, and discharges it to outside of the turbid water intake pit.

According to the present invention, clogging substances (such as silt) which accumulate or are tapped in the surface layer portion are blown upward into the seawater in a turbid water intake pit together with a filtration sand by the agitation device which agitates the surface layer portion of the sand filtration layer only at a desired depth. When this happens, the turbid water resulting from mixing the clogging substances (such and silt) and the filtration sand is blown upward into a turbid water intake pit, so that highly concentrated turbid water does not drift in the area surrounding the sand filtration layer.

Advantageous Effects of the Invention

The present invention is able to reduce the impact on the surrounding environment with the agitation device and the suction and discharge device, which are operated in the turbid water intake pit, suction the clogging substances trapped in the surface layer and discharge them to outside of the system. The present invention is also able to prevent clogging by removing the clogging substances in a suitable and timely manner, thereby making installation possible in an ocean area where there is little movement of seawater. Therefore, even in cases where the seawater infiltration rate is increased as high as possible under 400 m/day, this infiltration rate can be maintained, enabling a stable implementation of infiltration intake with a water intake surface area which is greatly reduced in comparison to the prior art.

DETAILED DESCRIPTION OF THE PREFERRED EMBODIMENT

In the present invention, turbid water containing clogging substances (such as silt) which are discharged to outside of a turbid water intake pit by a suction and discharge device is ideally recycled to outside of the system so as not to negatively impact the environment surrounding the sand filtration layer.

From the standpoint of material balance in the natural environment, it is conceivable that turbid water which has been suctioned should be directly discharged to the surrounding ocean area, in the sense that turbid water containing clogging substances would then be returned to the original natural environment.

On the other hand, there are many cases in which there is a strong desire for the visual impact and environmental impact on neighboring areas to be taken into consideration with regard to turbid water containing clogging substances. Therefore, in cases where turbid water discharged by a suction and discharge device is discharged to outside of the system instead of recovering it, it is desirable to dilute it and to disperse it to multiple locations.

In other words, the suction and discharge device has a structure which utilizes a difference in settling rates of clogging substances and filtration sand, so that clogging substances are selectively suctioned from turbid water containing a mixture of filtration sand and clogging substances which are blown upward into the seawater in a turbid water intake pit. Accordingly, the impact on the surround environment is minimized, because the surface of the sand filtration layer is left intact, with minimal suction of the filtration sand required to maintain a sand filtration performance, and selectively suctioning only those clogging substances which cause clogging, and discharging them to the outside.

Moreover, the suction sand discharge device further dilutes the turbid water from which clogging substances are suctioned, distributes it to multiple locations, and distributes it to outside of the turbid water intake pit. When this is done, not only is the impact on the surrounding environment minimized, but there is also no obvious visual impact, because the discharged water is diluted and dispersed.

EXAMPLES

Examples of the present invention are described in detail below, with reference being made to FIG. 1 to FIG. 6.

Figure 1:
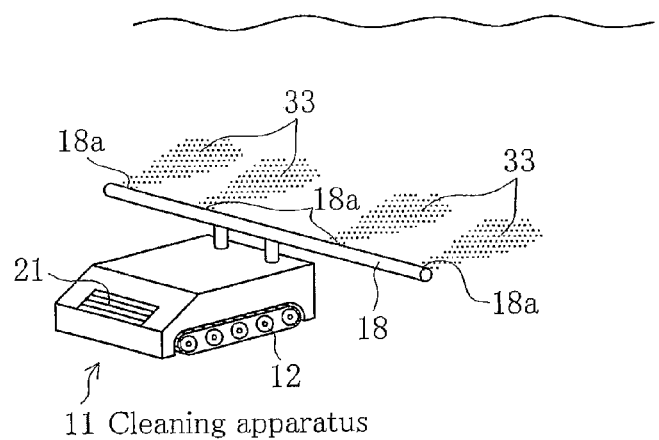
FIG. 1 is a schematic drawing showing an external view of the cleaning apparatus for a sand filtration layer according to the present invention.

FIG. 1 is a schematic drawing showing an external view of a cleaning apparatus 11 for a sand filtration layer according to the first example.

The cleaning apparatus 11 of the first example employs drive wheels 12 with a crawler belt, as a driving device configured to move across the surface of the sand filtration layer. The cleaning apparatus 11 is an automated self-propelled cleaning apparatus which operates on a surface of the sand filtration layer according to a pre-installed program, moving in a horizontal direction at a predetermined speed on a specified surface of the sand filtration layer at a set time, while cleaning an infiltration surface beneath an area where the device passes under predetermined conditions.

The timing and time-frame for cleaning are optimally set so as not to cause clogging by clogging substances, depending on the water quality of the ocean area where the sand filtration layer is installed, the water temperature, the season, and other conditions. Basically, cleaning is repeated at specified times for each specified time-frame according to a set program. However, it is possible to change the timing and time-frame as desired.

Reference Numeral 21 is a seawater influx port for taking seawater into the apparatus from the outside. Reference Numeral 18 is a discharge pipe for diluted turbid water which is disposed along a direction crossing a direction of advance of the cleaning apparatus 11. Reference Numeral 33 is water which is discharged respectively from discharge ports 18a of the discharge pipe 18 for diluted turbid water. The discharged turbid water is dispersed, so it does not stand out visually, and has little environmental impact, because a plurality of discharge ports 18a are provided, as shown in FIG. 1.

Figure 2:
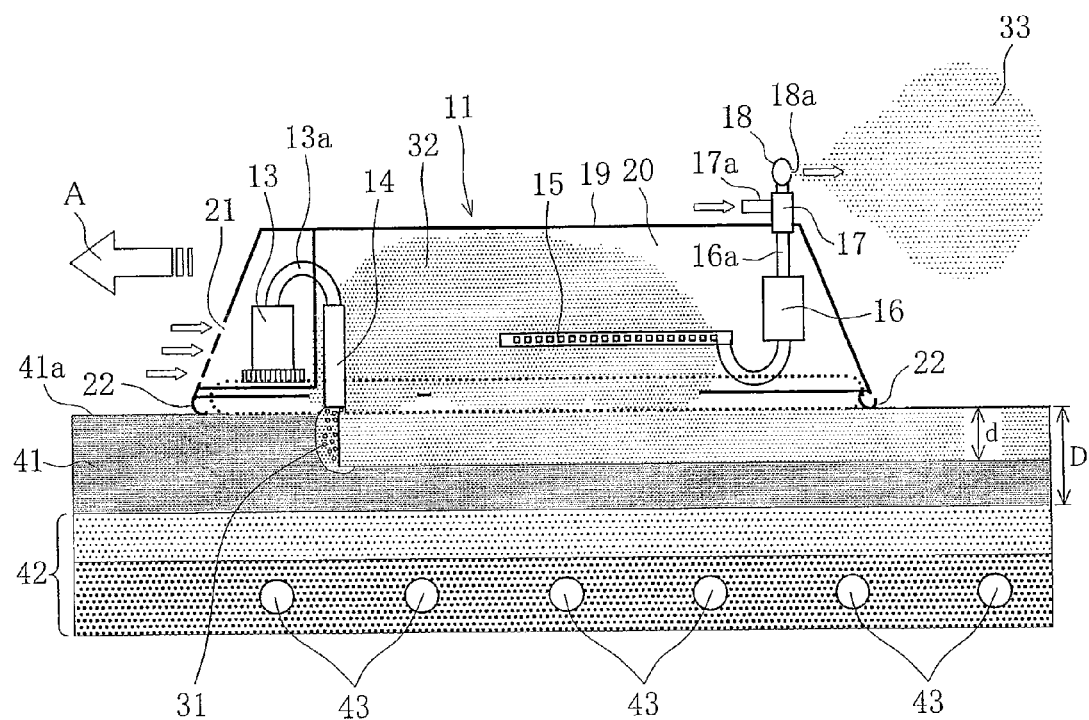
FIG. 2 is a drawing illustrating the internal structure of the cleaning apparatus for a sand filtration layer according to the present invention. The drawing shows only the structures relating to the cleaning function, and moving parts such as a driving device and a motor are omitted.

FIG. 2 is a drawing illustrating the internal structure of the cleaning apparatus 11, showing only the structures relating to the cleaning function, and moving parts such as the drive wheels 12 and a motor are omitted. In FIG. 2, the arrow A indicates the direction of advance of the cleaning apparatus 11.

Reference Numeral 41 is a filtration sand layer, and Reference Numeral 42 is a supporting gravel layer in which is embedded a water intake pipe 43. The filtration sand layer 41 and the supporting gravel layer 42 form a filtration layer in which the seawater infiltration rate is increased as high as possible under 400 m/day.

The cleaning apparatus 11 of the first example uses a pump 13 and a jet nozzle 14 as an agitation device for agitating the surface layer portion of the sand filtration layer only at a desired depth and for blowing the clogging substances upward into the seawater within a turbid water intake pit 20 together with the filtration sand of the surface layer portion.

In other words, seawater is taken into the cleaning apparatus 11 from the seawater influx port 21 by means of the pump 13, and the water which is under pressure from the pump 13 is injected as a high-pressure jet water flow 31 from the jet nozzle 14 via a connecting pipe 13a.

The angle of injection of the jet nozzle 14 is set so that the jet water flow 31 strikes a surface 41a of the filtration sand layer 41 at almost a right angle. Moreover, the water pressure of the jet water flow 31 is set so as to enable agitation of the filtration sand layer at a depth d at which the clogging substances can be taken in, and this depth is a part of a total depth D of the filtration sand layer 41. Adjusting the water pressure in this manner makes it possible for the cleaning depth at which water is injected from the jet nozzle 14 is a depth at which a minimum required amount of filtration sand is agitated.

When the surface of the filtration sand layer is struck by the high-pressure jet water flow 31, clogging substances which accumulate or are trapped in the surface layer portion of the filtration sand layer 41 are agitated by the jet water flow 31, together with the filtration sand. The filtration sand and the clogging substances trapped in the filtration sand agitated by the jet water flow 31 are blown upward into the seawater in the turbid water intake pit 20.

In the present invention, a turbid water mixture 32, wherein clogging substances and filtration sand are mixed, is blown upward and stays inside the turbid water intake pit 20, as shown in FIG. 2. Thus, in the present invention, the highly-concentrated turbid water does not drift into the area surrounding the sand filtration layer when agitation is performed.

The cleaning apparatus 11 of the first example uses a perforated pipe 15 for suctioning turbid water, a pump 16, an ejector 17, and a discharge pipe 18 for dilute turbid water as a suction and discharge device for suctioning turbid water blown upward into seawater in the water intake pit 20 by the agitation device, and for discharging it to outside of the turbid water intake pit 20.

The turbid water mixture 32 which is blown upward into the turbid water intake pit 20 contains clogging substances which cause clogging, and also contains filtration sand which does not cause clogging, but is needed to maintain the seawater filtration performance.

Accordingly, the suction and discharge device of the first example is configured so as to selectively suction clogging substances from the turbid water containing a mixture of clogging substances and filtration sand blown upward into the seawater within the turbid water intake pit 20, by utilizing a difference in settling rates of clogging substances and filtration sand.

Figure 3:
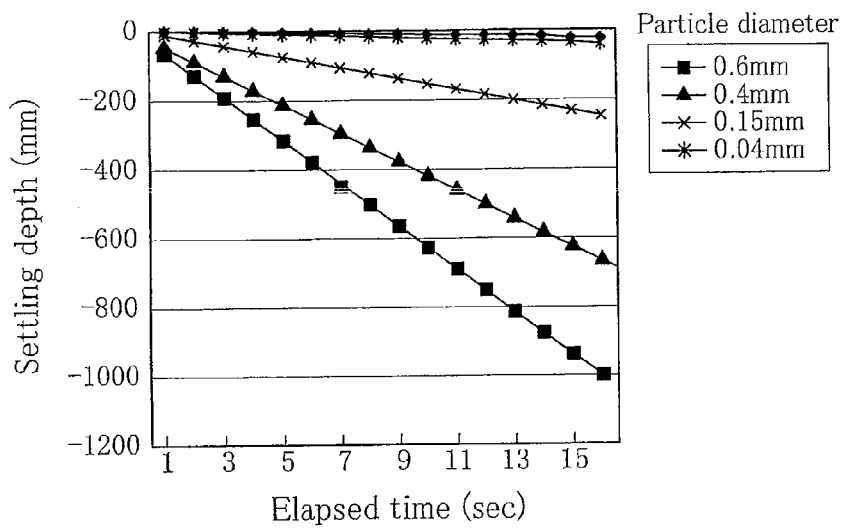
FIG. 3 is a graph comparing settling rates in seawater according to particle diameter.

In detail, as shown in the graph in FIG. 3, at least 60 cm of filtration sand settles after 15 minutes, exhibiting a rapid settling rate, because the particle diameter is in a range of 0.4-0.6 mm for example, but the clogging substances exhibit a slow settling rate, and are in a floating state after 15 minutes, because the particle size is less than 0.04 mm, for example. Therefore, it is possible to selectively suction only the clogging substances, and to leave as much filtration sand on the surface 41a of the filtration sand layer 41 as possible without suctioning when the suction and discharge device is operated at a timing and at a position where large quantities of clogging substances are present in the seawater, by adjusting the height level of the perforated pipe 15 for suctioning turbid water which has a large number of holes, and by adjusting the timing at which the pump 16 is driven and the turbid water mixture 32 is suctioned.

The turbid water mixture 32 is suctioned using the pump 16 via the perforated pipe 15 at a timing at which the clogging substances are selectively suctioned. The turbid water, which is pressurized by the pump 16 is fed to the ejector 17 via a connecting pipe 16a.

The turbid water fed to the ejector 17 is mixed with natural seawater suctioned through an influx port 17a by the action of the ejector 17, so as to further dilute the turbid water. The diluted turbid water is fed to the discharge pipe 18 for diluted turbid water which is configured as in FIG. 1, and dispersed by being discharged from a plurality of discharge ports 18a. Reference Numeral 33 is water which is discharged and dispersed after being diluted. When marine environmental safety is taken into consideration, is it desirable for there to be provided as many discharge ports 18a as possible with as much space between them as possible.

In FIG. 2, Reference Numeral 19 is a frame which is open on its lower side facing the sand filtration layer, and forms the outer edges of the cleaning apparatus 11. Reference Numeral 22 is a partition attached to the lower outer periphery of the frame 19. In the present invention, settling and separation treatment of sand and clogging substances contained in the turbid water mixture 32 which is blown upward when agitated by the jet water flow 31, is carried out entirely within a sealed space in the turbid water intake pit 20. The partition 22 is a member which serves to seal a gap between the lower outer periphery of the frame 19 and the surface of the sand filtration layer, so as to ensure the water-tightness of the turbid water intake pit 20, and is formed from a flexible material such as rubber or plastic.

Accordingly, the turbid water intake pit 20 of the present invention is a structure devised with consideration given to the surrounding environment, because the highly turbid water which contains a mixture of clogging substances and filtration sand blown upward into the seawater is substantially hindered from being directly dispersed into the vicinity and contaminating it. Moreover, the suction and discharge device of the first example is able to inhibit dispersion into the surrounding area, because suspended material (turbid water) formed after agitation is treated as much as possible inside the turbid water intake pit 20, with the aim of protecting the marine environment. Moreover, when clogging substances are directly discharged into the vicinity, impact on the surrounding environment can be minimized, because the clogging substances are mixed with natural seawater and diluted by means of the ejector 17, and dispersed to multiple locations when discharged from the discharge pipe 18 for diluted turbid water.

Figure 4:
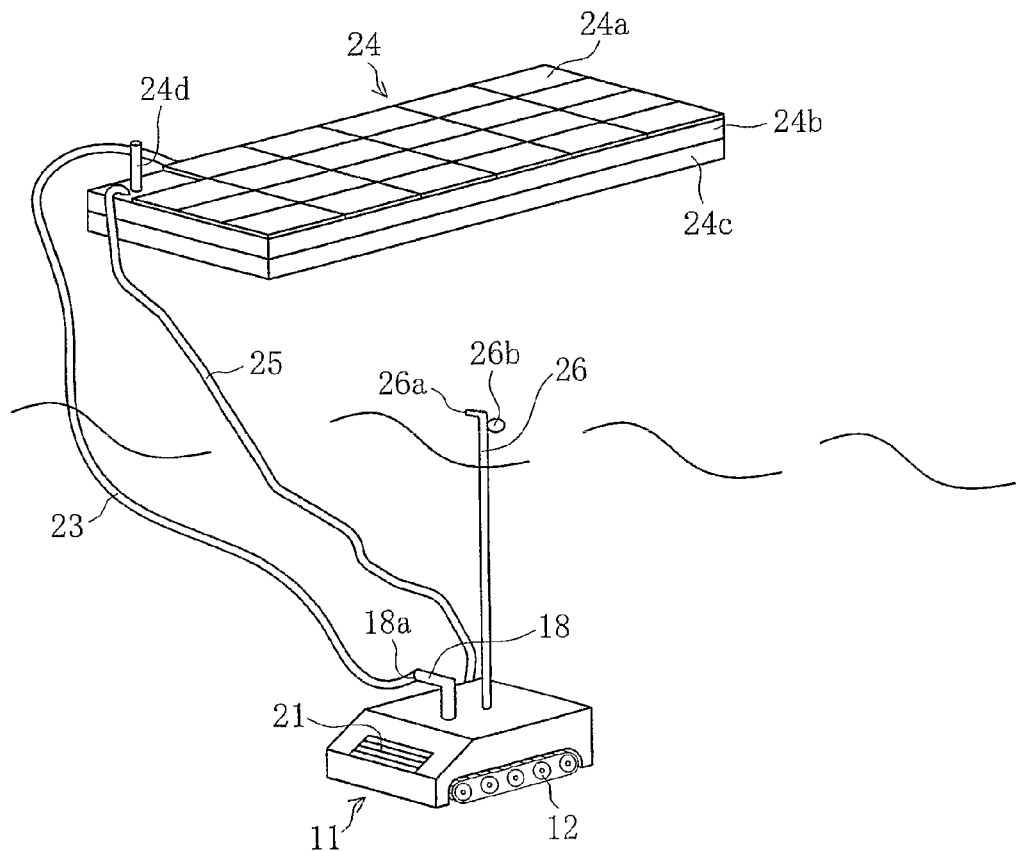
FIG. 4 is a drawing illustrating the structure of the cleaning apparatus of the second embodiment of the present invention.

Following is a description of the structure of the cleaning apparatus 11 of the second example of the present invention, in terms of its differences with the first example, making reference to FIG. 4.

In the first example, the cleaning apparatus itself was equipped with a power source such as a battery to drive a motor which rotates the drive wheels 12. By contrast, in the second example, as shown in FIG. 4, the cleaning apparatus 11 is provided with power from a floating body 24 equipped with solar panels 24a and a storage battery 24b and a float 24c, via a cable 25, thereby enabling it to clean over a wide area and for a long period of time.

In this example, power can be generated not only by a photovoltaic system such as the solar panels 24a, but it can also be generated by using renewable natural energy sources such as a wind power generator wave power generator, an ocean thermal energy conversion system, or the like, which can be mounted on the floating body.

In the first example, the filtration sand layer 41 containing clogging substances was agitated and cleaned only by the flow of water injected from the jet nozzle 14. By contrast, the cleaning apparatus 11 of the second example uses a jet water flow from an air mixture type nozzle in order to achieve cleaning at a greater depth. In this case, the air which is to be mixed is supplied by an air suction orifice 26a at the tip to an air mixture type nozzle inside the cleaning apparatus 11 via an air influx pipe 26, by the action of a float 26b.

In addition, in the first example, the turbid water fed to the discharge pipe 18 for dilute turbid water is discharged from the discharge ports 18a after dilution and is dispersed. By contrast, in the cleaning apparatus 11 of the second example, the discharge ports 18a of the discharge pipe 18 for dilute turbid water are connected to a water discharge pipe 23, and after dilution, the discharged water is collected into the floating body 24 on the surface of the ocean. In this case, the floating body 24 is provided with a suction pump.

Moreover, Reference Numeral 24d is a receiver which receives GPS data. By locating the current position from the GPS data, it can be determined whether or not the cleaning apparatus 11 is operating in the correct area. Transmission and receipt of signals between the floating body 24 and the cleaning apparatus 11 can be carried out via the cable 25.

According further to the present invention, the cleaning apparatus itself does not need to be equipped with both a cleaning mechanism and a driving mechanism. For example, engines, motors, batteries, pumps, solar panels and other power generators, and equipment such as GPS systems may be installed on a floating platform as in the second example, and the system may be configured so that the cleaning apparatus is driven on the ocean floor where it is equipped with only the minimum necessary mechanism for cleaning.

According to the second example, dispersion to the surrounding area can be restricted, because suspended material (turbid water) formed after agitation is treated as much as possible inside the turbid water intake pit 20, with the aim of protecting the marine environment. Moreover, there is no risk of impacting the surrounding environment, because the discharged water is temporarily recovered in the floating body 24, and then fed to another dedicated water discharge treatment facility.

Figure 5:
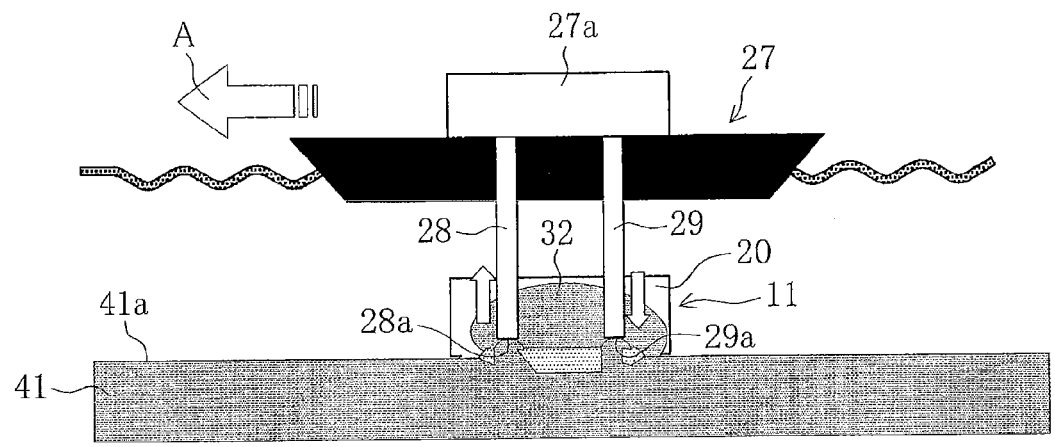
FIG. 5 is a drawing illustrating the structure of the cleaning apparatus of the third embodiment of the present invention.

Following is a description of the cleaning apparatus 11 of the third example of the present invention, making reference to FIG. 5.

In the first example, filtration sand containing clogging substances was agitated and cleaned in the turbid water intake pit 20 by means of a flow of water injected from the jet nozzle 14. By contrast, the cleaning apparatus 11 of the third example illustrated in FIG. 5 has a filtration material cleaner 27a mounted on the floating body 27, and cleaning is performed by this filtration material cleaner 27a.

That is to say, in the cleaning apparatus 11 of the third example, filtration sand in which clogging substances are trapped is drawn into the filtration material cleaner 27a via a suction pipe 28. For this purpose, a suction orifice 28a of the suction pipe 28 is positioned inside the turbid water intake pit 20 in the vicinity of the surface 41a of the filtration sand layer 41. Further, filtration sand which was cleaned inside the filtration material cleaner 27a by removing clogging substances is delivered to the cleaning apparatus 11 via a delivery pipe 29, and backfilled to the sand filtration layer 41. For this purpose, an opening 29a of the delivery pipe 29 is positioned in the vicinity of the surface 41a of the filtration sand layer 41.

Accordingly, the cleaning apparatus 11 of the third example moves in a direction of an arrow A together with the floating body 27, while repeating the process of drawing up and backfilling the filtration sand.

By employing such a configuration, there is no contamination of the surrounding area of the sand filtration layer by the turbid water 32 which is generated by drawing up and backfilling the filtration sand, because the drawing up and backfilling of the filtration sand is performed inside the turbid water intake pit 20. Moreover, there is no risk of impacting the surrounding environment, because the discharged water is recovered by the filtration material cleaner 27a on the floating body 27, and then fed to another dedicated water discharge treatment facility.

By using the cleaning apparatus of the present invention, the infiltration rate can be maintained, even in cases where the seawater infiltration rate is increased to a rate as high as possible under 400 m/day, because clogging can be effectively prevented by removing clogging substances which accumulate or are trapped in the surface layer of the sand filtration layer.

For example, in the case of a facility for which there is a water intake demand of 100,000 t/day, the required water intake area is 20,000 m² in the prior art water infiltration intake method where the infiltration rate is 5 m/day, but by combining water infiltration intake method disclosed by the present applicant and the cleaning apparatus of the present invention, so as to maintain an infiltration intake rate of 100 m/day, it becomes possible to significantly reduce the required water intake surface area to 1,000 m², which is ⅟₂₀ that of the prior art. Therefore, it becomes possible to reduce the scale of construction during installation, and also to significantly ameliorate the impact on the environment during construction.

The present invention is not limited to the above-described examples, and the preferred embodiment may, of course, be advantageously modified within the scope of the technical ideas recited in the claims.

Figure 6:
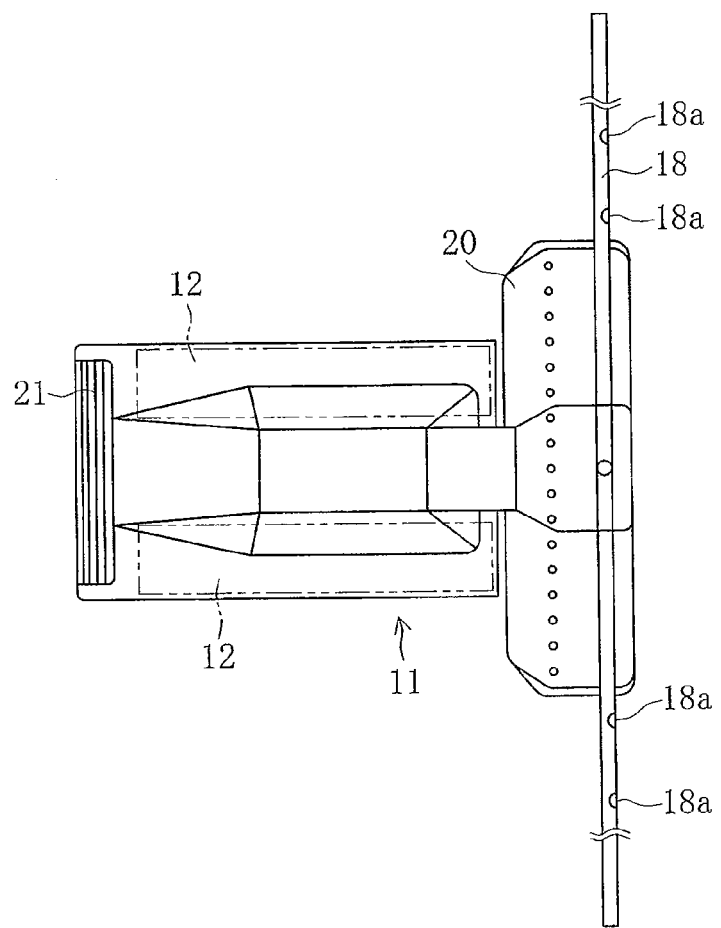
FIG. 6 is a drawing showing another example of the external appearance of the cleaning apparatus of the present invention.
Figure 7:
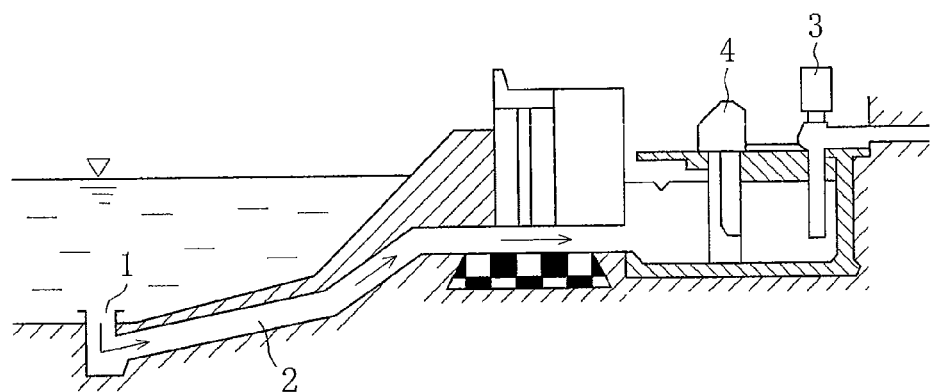
FIG. 7 is a schematic diagram of a direct water intake method of the prior art.
Figure 8:
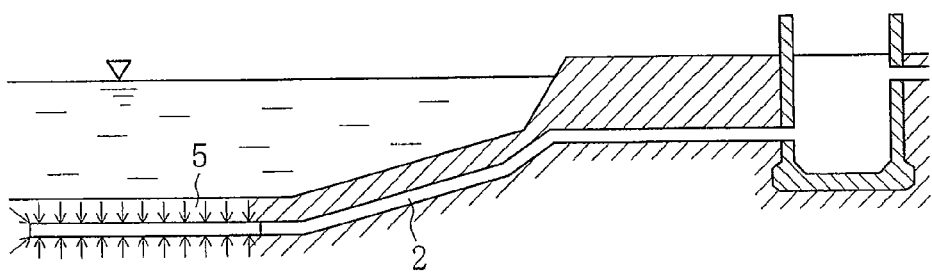
FIG. 8 is a schematic diagram of an indirect water intake method of the prior art.
Figure 9:
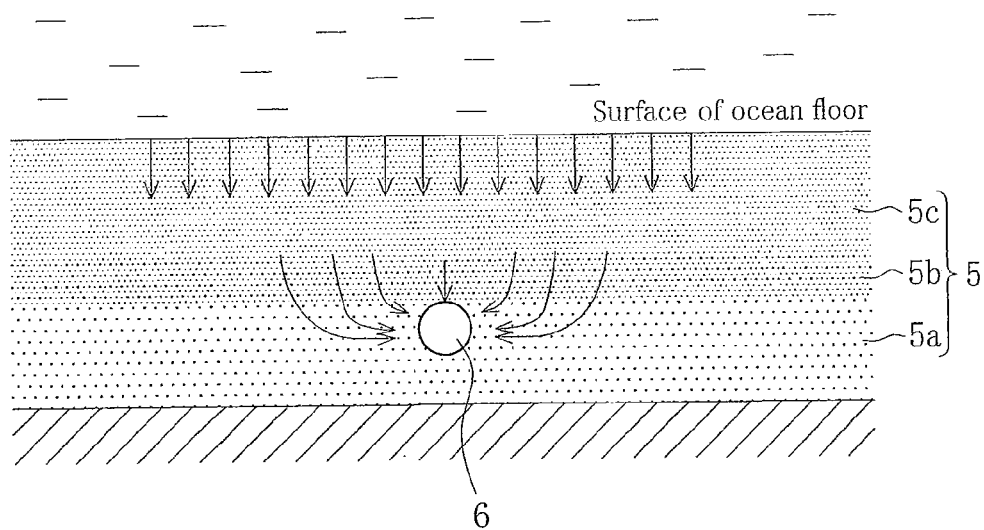
FIG. 9 is a schematic structural diagram of the ocean floor infiltration section.
Figure 10:
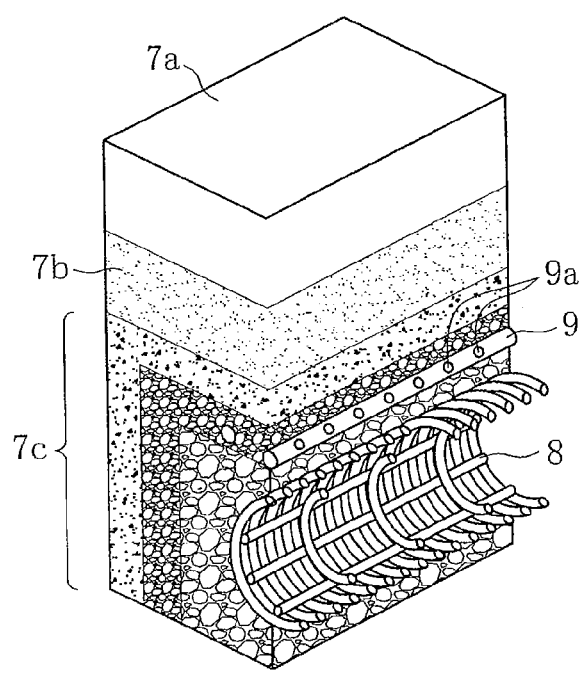
FIG. 10 is a drawing illustrating a cleaning pipe used in a river.

For example, in the first example, there was disclosed a cleaning apparatus with a configuration as illustrated in FIG. 1, but the external configuration is not limited thereto. For example, as shown in FIG. 6, the cleaning mechanism can have the turbid water intake pit 20 expanded beyond the width of the driving mechanism equipped with the drive wheels 12, to enable efficient cleaning.

Moreover, in the first example, there was disclosed an example in which the jet water flow 31 injected from the jet nozzle 14 strikes the osmosis surface of the sand filtration layer at almost a right angle. However, the direction of injection of the jet water flow 31 may be at an angle slightly opposed to the direction of advance of the cleaning apparatus 11, so that the turbid water mixture 32 containing filtration sand blown upward will flow smoothly in the direction of the turbid water intake pit 20.

In addition, in the first example, there was disclosed a self-propelled cleaning apparatus 11, but the cleaning apparatus of the present invention may be pulled by a platform ship which moves on the ocean.

Yet further, in the first example, there was disclosed an example of a case in which the pump 13 and the jet nozzle 14 were used to produce a flow of water as the agitation device, but the present invention is not limited thereto. It is also possible to use mechanical tillage-type agitation with rotating blades or spiral blades as the agitation device.

What is claimed is:

1. A cleaning apparatus which prevents clogging by removing clogging substances which accumulate or are trapped in a surface layer of sand filtration layer which is utilized to perform osmotic intake of seawater, the cleaning apparatus comprising:
   a submersible self-propelled motorized driving device configured to move across the surface of the sand filtration layer by drive wheels,
   a cover frame which encloses an entire cleaning apparatus;
   a seawater current agitation device which is front located in a forward direction of movement of the cleaning apparatus and is enclosed within the cover frame, configured to agitate only a surface layer portion of the sand filtration layer at a desired depth as the cleaning apparatus advance forward by suctioning and blowing same surrounding seawater to stir currents upward the clogging substances trapped in the sand filtration layer together with the filtration sand of only the surface layer portion to form a turbid water mixture which is collected in a turbid water intake pit, wherein the turbid water intake pit is enclosed within the cover frame and is located behind the seawater current agitation device, and
   a seawater suction and discharge device which is rear located at the cleaning apparatus behind the turbid water intake pit and is also within the cover frame, configured to utilize a differential settling rates between the clogging substances and the filtration sand to selectively suction and pump out most of the clogging substances in the turbid water mixture in the turbid water intake pit, and afterwards, pump and discharge the clogging substances to the seawater outside of the cover frame.

2. The cleaning apparatus according to claim 1, wherein the turbid water intake pit is structured to inhibit a highly turbid water which contains a mixture of the clogging substances and the filtration sand blown upward into the seawater from being directly dispersed into the vicinity of the sand filtration layer, and is provided with a partition that seals a gap between a lower outer periphery of the cover frame and the surface of the sand filtration layer to ensure water-tightness.

3. The cleaning apparatus according to claim 1, wherein the seawater suction and discharge device further dilutes the turbid water mixture from which the clogging substances are selectively suctioned, is configured to disperse the clogging substances by using an ejector to mix it with natural seawater, send the clogging substances to a discharge pipe flor diluted turbid water that has multiple discharge orifices, to multiple locations, and discharge the clogging substances to outside of the turbid water intake pit.

* * * * *